(No Model.)

H. H. ABELL.
FASTENING FOR CORDS OR THE LIKE.

No. 544,076.          Patented Aug. 6, 1895.

WITNESSES:
Fred White
Thomas F. Wallace

INVENTOR:
Harry H. Abell,
By his Attorneys,
Arthur E. Fraser & Co.

UNITED STATES PATENT OFFICE.

HARRY H. ABELL, OF PORT EWEN, NEW YORK.

FASTENING FOR CORDS OR THE LIKE.

SPECIFICATION forming part of Letters Patent No. 544,076, dated August 6, 1895.

Application filed April 9, 1895. Serial No. 545,056. (No model.)

*To all whom it may concern:*

Be it known that I, HARRY H. ABELL, a citizen of the United States, residing in Port Ewen, in the county of Ulster and State of New York, have invented certain new and useful Improvements in Fastenings for Cords or the Like, of which the following is a specification.

This invention relates to fastenings for cords and the like and aims to provide an improved device for this purpose. Such fastenings are generally employed to fasten the end of a cord, strand, lace, or tie of any description, the fastening being accomplished by turning the cord on itself about the fastener and retaining it in this position by friction or pressure. Such fasteners can be variously used, but according to the preferred form of my invention I provide a fastener which can be connected to one end of a cord, or to an object to which one end of the cord is attached, and used as a fastening for the free end of the cord, and I provide certain features of improvement in the construction of the fastening, as will be hereinafter more fully set forth with reference to the accompanying drawings, in which—

Figure 1:
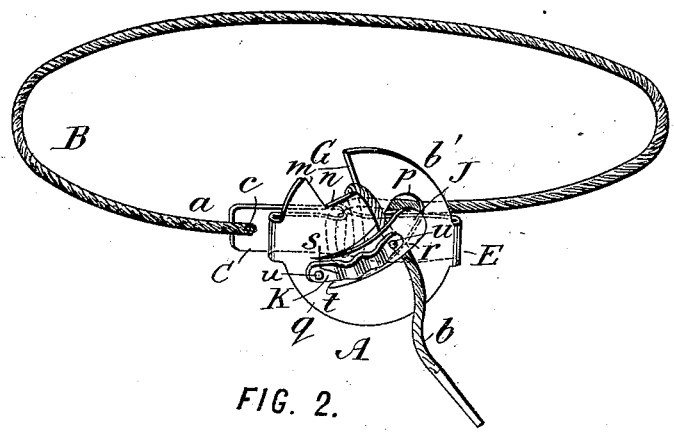
Figure 2:
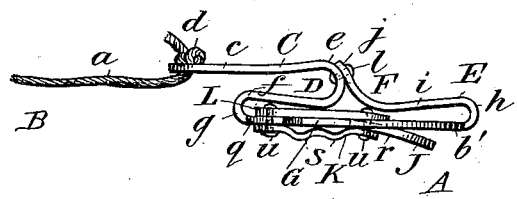

Figure 1 is a perspective view of the preferred form of my fastening, and Fig. 2 is a plan view thereof.

Referring to the drawings, let A indicate the fastener proper and B the cord, which at one end $a$ is permanently attached, according to one feature of my invention, to the fastener A, and at its other or free end $b$ can be secured to the fastener at any point by winding it around the latter.

In its preferred form the fastener A consists of a relatively large and preferably circular and substantially flat body $b$, and an eye or equivalent provision $c$, by which the body is attached to the part carrying it—in this instance the end $a$ of the cord. The connection between the eye and cord is made in the construction shown by a knot $d$ on the cord which takes against the rear side of the eye when the cord is passed through the latter. The eye is preferably formed in a latterly-extending shank C, projecting from the rear side of the body radially from a point near the center thereof, which shank bends forwardly in a bend $e$, which bend constitutes a hook D, beyond which the shank returns on itself at $f$ to the outer edge of the body, which it joins by a forward curve $g$. At the opposite side of the body I prefer to provide a similar but shorter shank E, leaving the periphery of the body by a rearward curve $h$, thence extending toward the center of the body throughout its portion $i$, thence having a rearward curve F, terminating in an end $j$, embracing the rear or outer side of the bend $e$ of the shank C, and suitably secured thereto, as by the rivet $l$, to reinforce the shank C.

The body $b'$ has fastening provisions for receiving and holding the free end of the cord. These preferably consist of a recess or passage G at or near the edge of the body and a clamp J near the center of the body. The recess G I prefer to form as a radial notch at the upper edge of the body extending diagonally from a point above and at the side of the hook D from the periphery of the body inwardly toward the center thereof. It preferably has parallel side walls $m$ and a rectilinear bottom wall $n$ extending at right angles to the side walls, which walls are best formed by the adjacent edges of the material of which the body is formed, the recess being formed by cutting out the necessary material from the body.

The fastening J is preferably an elastic fastening consisting of a tongue $o$, extending transversely of the recess G, projected sufficiently in front of the body to permit entrance of the cord between the tongue and the latter and pressing the cord toward the body with an elastic pressure.

I prefer to form the tongue of the material of the body by cutting it out therefrom, whereby a slot $p$ is formed in the body at the inner side of the tongue, within which the latter is in part disposed, into which it can move, and toward which it presses the cord, thereby the more firmly holding the latter. The tongue, preferably, has a curved shape and is disposed at substantially right angles to the direction of the recess G, so that the tongue extends diagonally of the body in one direction, the recess diagonally thereof in another direction, and the shanks transversely thereof in still another direction. The curvature of the tongue is such that its concave edge is adjacent to the recess and its convex edge distant therefrom, and its curvature is preferably that of the arc of a circle struck from near the bottom of the recess, so that as the cord is swung under the tongue it will preserve a fixed position relatively to the latter, as it will swing on substantially the same center as that from which the arc of the tongue is struck. This curving of the tongue permits making it sufficiently long to securely hold the cord. Pointing its free end upwardly also assists in avoiding escape of the cord.

I prefer to add to the inwardly-pressing elasticity of the tongue by a leaf-spring K, applied preferably to the front face of the body at $q$ and to the intermediate portion of the tongue at $r$, and having a free and preferably transversely corrugated elastic portion $s$ between its ends, permitting the requisite movement of the tongue and pressing the latter inwardly. I prefer also to strengthen the tongue by applying thereto a reinforce, preferably in the form of a plate L, at the rear of the tongue fastened to the rear of the body, traversing the base $t$ of the tongue and fastened to the intermediate portion thereof.

Any suitable means for fastening either the plate L or the spring K may be employed, but I prefer to use rivets $u$, traversing both these parts and the body of the tongue and the body $b'$, as shown.

In operation the free end of the cord to be fastened is passed into the hook D from above, brought around the shanks and upwardly opposite the curve F, then forwardly through the recess G, then downwardly and swung under the tongue J to effect the fastening of the cord. The reverse of these operations loosens the cord.

When constructed as shown the fastening and cord may be used for any binding or tying purposes.

The fastening proper may be constructed of any suitable material, but I prefer to use soft or malleable metal—as sheet-brass or sheet-iron—stamping it all out of one piece for the body, tongue, and shanks, and use elastic metal for the spring and the reinforce.

It will be understood that the invention is not limited to the particular details of construction and arrangement set forth and shown as its preferred form, but that it can be adapted according to such modifications as the judgment of those skilled in the art may dictate.

What I claim is—

1. The improved fastening, consisting of a fastener, having a body, a shank at rear thereof, and an eye carried by said shank, in combination with a cord fixed at one end in said eye, and free at its other end, and there adapted to be fastened to said fastener, said fastener having on the outer part of its body a recess, and at the face of said body a holder, whereby said cord can be fastened at its free end to said fastener by winding it around said shank, passing it through said recess and engaging it with said holder.

2. The improved fastener for cords and the like consisting of a body $b'$ having rearwardly extending shanks C and E meeting near the center of the body, a peripheral notch at the edge of the body, and a tongue near the center of the body, said tongue and notch disposed at substantially right angles, and said shanks disposed obliquely relatively to said tongue and notch.

3. In a fastener for cords and the like, a metal body, said body having a long shank folded from its edge at one point toward the center at rear, and extending thence outwardly, and having fastening provisions whereby it can be secured to an object, and said body having another and shorter shank folded from its edge at another point toward its center at rear and joined to first mentioned shank, to reinforce it, said shanks adapted to receive the winding of a cord fastened to the fastener.

In witness whereof I have hereunto signed my name in the presence of two subscribing witnesses.

HARRY H. ABELL.

Witnesses:
GEORGE H. FRASER,
CHARLES K. FRASER.